United States Patent [19]

La Sante, Sr.

[11] 4,429,599
[45] Feb. 7, 1984

[54] ONE WAY SCREWDRIVER

[76] Inventor: James A. La Sante, Sr., 733 Revere Ave., Bronx, N.Y. 10465

[21] Appl. No.: 455,324

[22] Filed: Jan. 3, 1983

[51] Int. Cl.³ ............................................. B25B 15/00
[52] U.S. Cl. ......................................... 81/436; 81/441
[58] Field of Search ................................. 81/441, 436

[56] References Cited

U.S. PATENT DOCUMENTS

| | | | |
|---|---|---|---|
| 1,055,031 | 3/1913 | Groos | 81/436 |
| 1,761,156 | 6/1930 | Rosan | 81/436 |
| 1,782,981 | 11/1930 | Anderson | 81/441 |
| 2,678,578 | 5/1954 | Bonanno | 81/436 |
| 2,804,894 | 9/1957 | Rosenburg | 81/436 |
| 3,253,625 | 5/1966 | Oestereicher | 81/436 |
| 3,601,170 | 8/1971 | Sciascia | 81/436 |
| 4,026,338 | 5/1977 | Goebel | 81/441 |
| 4,270,418 | 6/1981 | Shephard | 81/441 |

FOREIGN PATENT DOCUMENTS

| | | | |
|---|---|---|---|
| 26619 | 6/1931 | Australia | 81/441 |
| 112475 | 8/1900 | Fed. Rep. of Germany | 81/436 |

*Primary Examiner*—Frederick R. Schmidt
*Assistant Examiner*—J. T. Zatarga
*Attorney, Agent, or Firm*—Robert D. Farkas

[57] ABSTRACT

A tamper proof screw head screwdriver blade utilizes a handle attached to an elongated cylindrical shaft. The distal end of the shaft is contoured so as to have a pair of diametrically opposed wedge-shaped portions removed defining two pairs of wall-like surfaces, wherein each of the wall-like surfaces extend along a portion of the distal end of the shaft. The pair of corners located at the free end of the shaft and one of each of the pairs of wall-like surfaces, are broken away, defining two surfaces, each skew with the plane defined by the free end of the shaft and each extending in opposite directions forming an acute angle with the longitudinal axis of the shaft. In use, the blade is inserted in the head of a screw having a transverse notch therein separating a pair of curved surfaces extending outwardly from the floor of the transverse notch. The free ends of the screwdriver blade engage portions of each of the curved protrusion like surfaces in the head of the screw, thus permitting it to be removed by counterclockwise rotation of the screwdriver.

6 Claims, 7 Drawing Figures

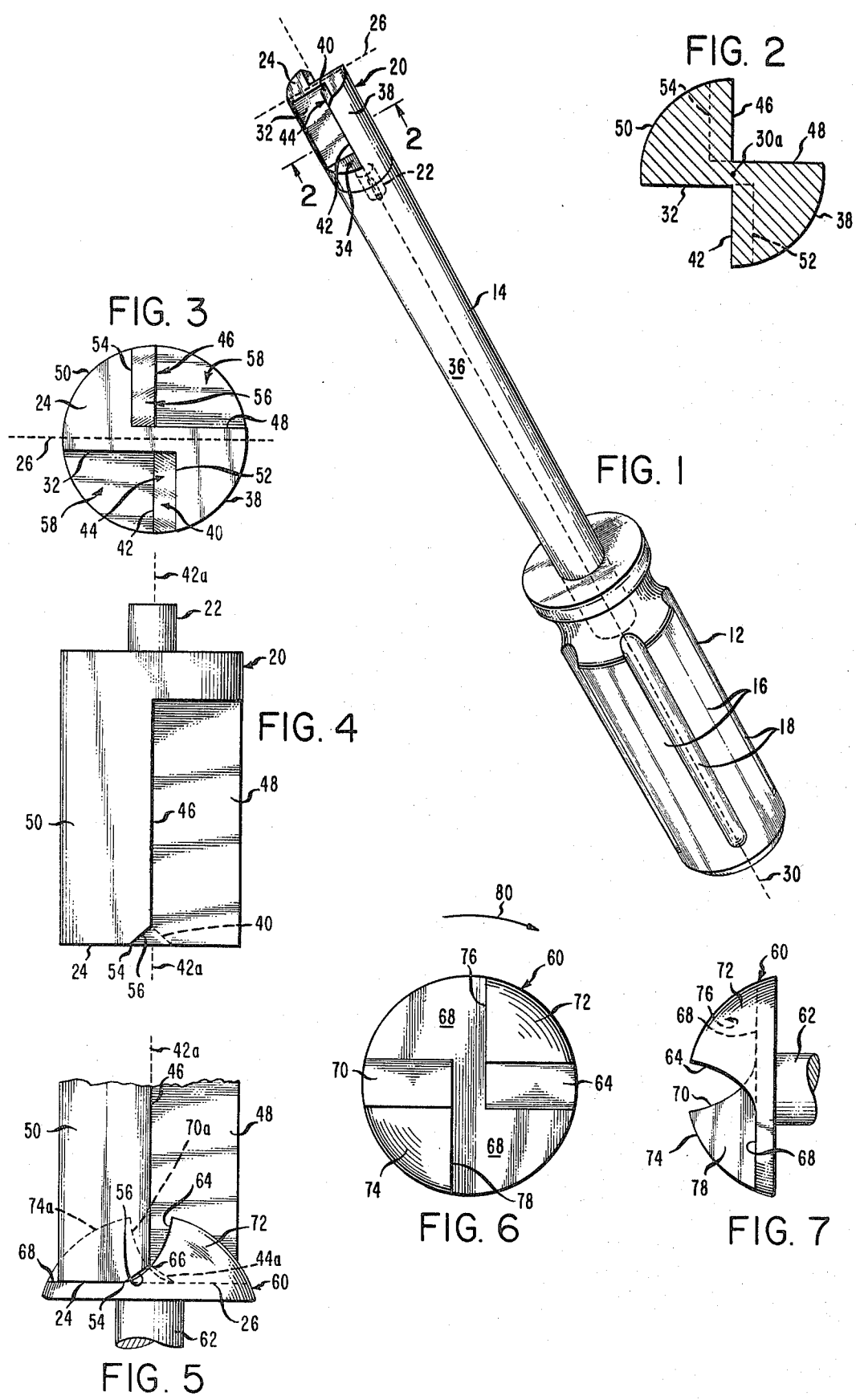

ONE WAY SCREWDRIVER

BACKGROUND OF THE INVENTION

1. The Field of the Invention

This invention relates to screwdrivers and more particularly to that class of screwdriving tools utilized with tamper proof screw heads wherein such screw heads are adapted to be driven in a clockwise direction utilizing a conventional screwdriving blade and further adapted to remain in such driven condition without being able to be removed by further use of a conventional screwdriver blade when operated in the opposite direction.

2. Description of the Prior Art

The prior art abounds with screwdrivers and screwdriving blades useful for driving a variety of screw heads. U.S. Pat. No. 3,658,105 issued to John Burt on Apr. 25, 1972 teaches a fastener driving arrangement in which there is a recess in the head of the fastener, having outwardly extending pockets with parallel sidewalls and bottomwalls defined by spherical segments, the driver having blades adapted to fit in the recess pocket, the blades having end walls that are complementary to the inner recess wall and side walls which are adjacent the inner bottom corner of each recess pocket and diverse progressively away from the recessed side wall in both the radial and axial direction so that, that when torque loads are applied, the recess wall will be caused to gradually increase the area of contact between the driver and the recess. This apparatus obviously provides a screwdriver blade for use with a special screw head which may be driven in both directions, utilizing a symmetrical pocket formed in the head of the blade wherein the symmetry is the same regardless of the direction of rotation of the screw head.

U.S. Pat. No. 3,695,321 issued Oct. 3, 1972 to J. W. Garehime, Jr. discloses the upper surface of the head of the screw having wedge shaped cavities arranged on either side of, or around, a central hub or land. The cavities have undercut sidewalls, and the land has a central hole, preferably circular in shape. The driving tool, such as a screwdriver, or the like, is provided with multiple blades which are spaced apart on either side of or around a central aperture. A central pin descends from the shank of the screwdriver and is adapted to engage the hole in the central land of the screw. The bottoms of the screwdriver blades are of expanded thickness so that when these blades are inserted in and engage the screw head cavities, the expanded bottom portions of the blades will lock under the undercut side walls of the cavity. Mating of the screwdriver blades in the screw head cavities is guided, thereby allowing stabilization by engagement of the screwdriver central pin in the hole in the central end of the screw head surface. Expandable pin sections maintained under tension may be employed to temporarily lock a screw on the screwdriver blade and hold in positive axial alignment with said screwdriver for insertion and withdrawal. Thus, the Garehime apparatus discloses a stabilized screwdriver whose screw engaging portion is caused to reside in touching engagement with surfaces which are symmetrically disposed, regardless of the direction of operation of the screwdriver.

U.S. Pat. No. 3,800,841 issued on Apr. 2, 1974 to F. L. Lindberg describes a screwdriver with a replaceable nib for use in production procedures to permit replacement of the nib as a wear part. The split nib has a distal end separation which in combination allows a resilient movement of the nibs to grasp the head of the screwdriver prior to insertion. Clearly, this invention discloses a useful tool whose life may be prolonged, by replacing the nib and which is effective in driving a screw in one direction and is useful in also removing the same screw. It may be stated, however, that the Lindberg apparatus is useful as a security tool by virtue of the unique shape of the convolutions and cavities formed in the screw head. In this sense, this apparatus is useful to permit unauthorized tampering of the screw.

SUMMARY OF THE INVENTION

A primary object of the present invention is to provie a manually operated screwdriver useful in operating screws of the "one-way" variety in either direction.

Another object of the present invention is to provide an inexpensive screwdriver whose shape and size may be utilized to remove screws of various designs that are applicable to use in security devices such as locks and other similar apparatuses.

Still another object of the present invention is to provide an inexpensively fabricated screwdriver which may be conveniently operated on screws of various sizes of the "one-way" variety.

Yet another object of the present invention is to provide a screwdriver whose shape and construction is readily indentifiable with a "one-way" screw use, thereby facilitating convenient selection of the screwdriver above other screwdrivers which may be carried by the user from place to place.

A further object of the present invention is to provide a one-way screwdriver that is simple to manufacture, inexpensive to fabricate, and useful in removing screws whose screw head surface is configured in a variety of shapes such that the shape presented to the screwdriver when operated in a clockwise direction is different from the shape presented to the screwdriver when operated in a counterclockwise direction.

Heretofore, one-way screws have found substantial use in the market place as being readily inserted using a flat bladed screw driver and extremely difficult to remove without requiring a drilling operation, frequently followed by a chiselling operation. Locks, electronic devices and other apparatuses requiring covers or fastening which are designed to be tamper proof frequently utilize screws of such character. Unfortunately, though it is relatively simple to install such screws it is almost impossible to remove these screws without a predrilling operation, usually directed in the center of the screw head extending along the longitudinal axis of the screw, followed by the insertion of a cap extractor or a tapered convoluted extractor which is driven by a tap handle or a wrench in the counterclockwise direction. Frequently, one-way screws are small in size. Thus, the removal operation is further complicated by virtue of the fact that great care must be exercised while drilling the hole and operating the screw extractor. The one-way screw, typical of such use, is characterized by a screw head having one transverse notch extending downwardly through the screw head surface coupled with a pair of arcuately shaped cross-sections in the remaining portions of the screw head. Thus, when a flat bladed screwdriver is operated in the slot, opposed lateral faces of the screwdriver blade engage the flat surfaces located on either side and at either extreme of the slot. Such flat sides are generally located in opposed quadrants such that the screwdriver blade when operated in a clockwise direction engages both flat sides. However, when the screwdriver operates in the opposite direction, the opposed lateral faces tend to come into contact with the gradually sloping inclined surfaces of the remaining portions of the screw head, causing the screwdriver to be forced outwardly from the slot and permitting the tip of the screwdriver blade from engaging only those portions of the protrusion parts of the screwdriver head to contact the screwdriver blade at a pair of points. Sufficient torque is not applied on the screw so as to permit its withdrawal from threaded engagement with surfaces to which it is installed by operating the screwdriver in the counterclockwise direction. The present invention contemplates these problems and provides an apparatus which engages those protrusion portions of the screwdriver head by straight line engagement along an elongated portion of each protrusion head thus minimizing the outwardly directed force exerted on the screwdriver blade and when operated in a counterclockwise direction to easily remove the screws from the surface on which it is installed.

These objects as well as other objects of the present invention will become more readily apparent after reading the following description of the accompanying drawings.

BRIEF DESCRIPTION OF THE DRAWINGS

FIG. 1 is a perspective view of the present invention.

FIG. 2 is a cross-sectional plan view, taken through line 2—2, viewed in the direction of arrows 2—2 of the illustration shown in FIG. 1.

FIG. 3 is a bottom elevation view of the free end of the apparatus shown in FIG. 1.

FIG. 4 is a partial enlarged side elevation view of the apparatus depicted in FIG. 1.

FIG. 5 is a partial enlarged side elevation view of the apparatus shown in FIG. 1 engaged in contact with a one way screw.

FIG. 6 is a top view of a typical screw head utilized with the apparatus shown in FIG. 1.

FIG. 7 is a side elevation view of the screw head device shown in FIG. 6.

DESCRIPTION OF THE PREFERRED EMBODIMENT

The structure and method of fabrication of the present invention is applicable to a screwdriver having a handle portion and an elongated cylindrical rod portion fixedly secured and coaxially aligned with the handle portion. The handle portion may be fabricated from a plastic material such as molded polystyrene so as to have a plurality of elongated grooves and ridges facilitating secure manual grasping thereof. The rod portion, extending outwardly from the screwdriver handle, is fabricated out of a steel or other metallic material so as to have a smooth cylindrical surface along the major portion of the length thereof. The free end of the rod portion terminates in a plane extending substantially at right angles to the longitudinal axis of the rod. Two portions of the length of the rod, each in diametrically opposed quadrants of the rod and being at the free end of the rod and extending towards the handle portion, are machined away so as to remove a pair of wedge-shaped sections, each having two surfaces at right angles to one another. The machined surfaces cut into the free end of the rod and extend upwardly towards the handle portion. The intersection of both pairs of surfaces extends along the length of the shaft and is parallel to the longitudinal axis of the shaft and passes through the plane defining the free end of the shaft. One of each pair of surfaces are positioned parallel to its equivalent, but not so as to be co-extensive. The remaining pair of surfaces in each quadrant extend parallel to one another in a common plane passing through and spaced uniformly distantly from the central longitudinal axis of the shaft.

Two additional portions of the shaft are removed at the corners defined by the two machined surfaces which reside in the plane passing through the longitudinal axis and the plane defining the free end of the shaft. Such broken away portions expose two skew planes, each defining surfaces residing in the range of 15 degrees to 62 degrees relative to the plane extending transverse to the longitudinal axis of the rod. Each of such surfaces terminate in corners, one of which (for each surface) resides in the plane extending transverse to the longitudinal axis of the rod, whilst the other corner extends transverse to the longitudinal axis of the rod, extending radially outwardly from such longitudinal axis and is located intermediate the free end of the rod and the handle portion of the apparatus.

In use, the screwdriver blade is inserted into a screw head having a transverse flat notch directed in the head of the screw and extending across the diameter of the screw head such that each notch is filled with the remaining tapered surface of the screw head, and more specifically with that portion of the screw head which extends gradually upwardly from the floor of the transverse notch so as to have the broken away edge of the screwdriver apparatus extend in contact with a pair of points along such curved surface. The corner extending in the transverse plane, transverse to the longitudinal axis of the rod, resides on the floor of the transverse notch. The other corner, similarly defining the broken away portion, contacts the curved surface of the screw head. Since there are two broken away portions, the screw head is engaged by four corners, two on the floor of the screw head and two at locations intermediate the floor of the screw head and the crown of the screw head, atop the curved surfaces. When the driver blade is operated in a counter clockwise position, the corners extending radially outwardly from the longitudinal axis of the rod, disposed a distance away from the plane at the free end of the rod, bite into the screw head along a common line on opposite sides of each curved surface of the screw head, facilitating the removal of the screw and minimizing the force exerted on the screwdriver. Such force would ordinarily tend to have the screwdriver pushed outwardly, along the longitudinal axis of the screwdriver and away from the surface of the screw head. However, because of the peculiar line to curve contact of this novel screwdriver invention, the tendency to cause the screwdriver to unseat itself, is diminished, if not totally eliminated.

Now referring to the figures, and more particularly to the embodiment illustrated in FIG. 1 showing the present invention 10 having a screw handle portion 12 and an elongated rod portion 14. Handle portion 12 is equipped with a plurality of grooves 16 and elongated notches 18 to facilitate gripping. Rod portion 14 has a generally cylindrical shape for a major portion of the surface thereof. A hardened tip portion 20 may be provided attached to rod portion 14, utilizing dowel 22 therefor, if desired. Such dowel may be press fit into a hole, not shown, in rod portion 14, with the dowel being a part of hardened tip portion 20, in a manner well known in the art. Alternatively, hardened tip portion 20 may be integral with rod portion 14 being a unitary construction. Rod portion 14, as hereinafter described, includes hardened tip portion 20, whether of unitary construction or otherwise. The distal most end 24, of rod portion 14, terminates in a plane defined by dotted lines 26, extending perpendicular to the longitudinal axis of rod portion 14, as defined by dotted lines 30. Vertical surface 32 extends between the distal end or free end 24 of rod portion 14 and to point 34, on rod 14. Point 34 defines the lowermost region of rod 14, whose surface 36 is cylindrical and the end portion of surface 32. Surface 38, disposed between free end 24 and beyond point 34, is, as shown in FIG. 1, extending the entire lengths of hardened tip portion 20. Such surface is semi-circular and resides contiguous with surface 36. Broken away portion 40 is positioned intermediate the plane defined by dotted lines 26, and vertical surface 42, which extends from one corner of broken away portion 40, to the end of hardened tip 20, and transverse to surface 32. As can be seen, surface 44, defined by broken away portion 40, extends skew to the plane defined by dotted lines 26, and intercepts surface 40, and is skew to surface 24.

FIG. 2 illustrates the right angular relationship between surfaces 32 and 42, reposing in one quadrant tip or distal most end 20 of the apparatus shown in FIG. 1. In like fashion, surfaces 46 and 48 reside at right angles to one another and are disposed in a diametrically opposed quadrant to the quadrant defined by surfaces 32 and 42. Semi-circular surface 50 has the identical shape as semi-circular surface 38, with surface 38 joining together surfaces 42 and 48, whilst surface 50 joins together surfaces 32 and 46. Extension of planes 42 and 46 pass through point 30(a), through which the longitudinal axis of shaft 14 proceeds, shown as dotted lines 30, in FIG. 1. Surfaces 32 and 48, while being parallel to one another, are not in a common plane, are separated a distance apart equivalent to the width of the thickness of the distal most end of a conventional screwdriver. Dotted lines 52 define the uppermost end of surface 44, shown in FIG. 1. Equivalently, dotted lines 54 define the uppermost end of another plane, not shown in FIG. 2, which plane is skew to surface 44, shown in FIG. 1.

FIG. 3 illustrates the relationship between skew surface 44 and its oppositely skewed surface 56. Plane 56 intersects distal most end 24, and plane 46, having its uppermost broken away portion defined by line 54. Surfaces 58 reside in a common plane which is parallel to the plane defined by dotted lines 26, shown in FIG. 1, and passes through point 34, also shown in FIG. 1.

FIG. 4 depicts the skew relationship between surface 40 and the surface 56. As can be seen, dotted lines 42(a) define the location of surfaces 42 and 46, shown in FIG. 2.

FIG. 5 illustrates screw 60, shown having shank portion 62, broken away. Concave surface 64, of screw 60, is shown being engaged at point 66, which is the intersection of surface 56 and surface 40. Point 66 does not tend to "ride up" concave surface 64, since it is sharp and well defined, preferably made of a hardened material, and only making a line contact with curved surface 64. Corner 54, being the intersection of surface 56, and surface 24, shown residing in the plane defined by dotted lines 26, rests upon flat surface 68, of screw 60. In like fashion, the skew plane defined by dotted lines 44(a), intersects the opposed concave surface defined by dotted lines 70(a), of screw 60. Solid portion 72, of screw 60, residing above root surface 68 of screw 60, resides in the quadrant of removed material defined by surfaces 64 and 48. Similarly, the solid portion, defined by dotted lines 74(a), of the opposed solid portion of screw 60, resides intermediate surfaces 32 and 42, illustrated in FIG. 3.

FIG. 6 illustrates screw 60 having a root surface 68 shown residing in diametricaly opposed quadrants. Surfaces 64 and 70 represent concave surfaces, of screw 60, which intersect with surface 68, along parallel lines, which are not co-extensive. Portions 72 and 74, represent convex surfaces intersecting surfaces 64, 76, 70 and 78 respectively, and terminating in vertical surfaces 76 and 78 respectively. In use, a screwdriver tip, of conventional design not shwon, is inserted intermediate surfaces 76 and 78, and turned in the direction of arrow 80, so as to secure screw 60 in threading engagement with a work piece, not shown. When such screwdriver tip is rotated in the direction counter to the arrow 80, the surfaces defining the screwdriver tip tend to ride up concave surfaces 64 and 70, preventing the rotation, in such loosening direction, of screw 60 from its work piece.

FIG. 7 illustrates screw 60, so as to point out opposed spaced apart surfaces 76 and 78, useful in the tightening of screw 60, to a work piece not shown.

As can be seen from FIGS. 5, 6 and 7, the flat portion of distal most end 24 of the present invention is engaged in intimate contact along surface 68 of screw 60. Surface 56, located communicating with distal most end 24, has its corners 66 and 54 engaging concave surface 64, whilst surface 44 has its corners engaging concave surface 70, in the same fashion, so as to have a force exerted upon screw 60, in a direction opposite to arrow 80, when apparatus 10 is rotated in such direction.

As can be seen, there is illustrated hardened tip area 20, defining planes 38 and 50, extending somewhat less than the total diameter of surface 68 of screw 60. If desired, hardened tip end 20 may be equipped so as to have an equal or greater dimension at the periphery of surface 24 than the diameter of plane 68 of screw 60.

If it is desired, surfaces 44 and 56 may be made concave, so as to sharpen the intersections thereof with surfaces 42 and 46 respectively, and in likewise fashion, the "cutting in" effects experienced by lines 52 and 54 at the root of concave surfaces 64 and 70 respectively, where such concave surfaces intersect plane 68, of screw 60. In any event, the present invention may be utilized to rotate screw 60, in the direction of arrow 80, so as to tighten screw 60 to a work piece not shown, if desired, and, by counter-rotation, to remove or loosen screw 60 from such work piece.

It will be obvious to those skilled in the art to modify the dimensions and shape of the distal most end of the present invention, so as to accomodate other forms of "one way screws". The present invention serves the advantage of loosening or removing one way screws, through the use of two skew planes, each communicating with the distal most end of the screwdriver-like apparatus, and extending upwardly and outwardly from such plane, so as to ultimately define two sharpened like edges each adapted to communicate with curved surfaces of a one way screw, and when so adapted, tend to loosen same, rather than to engage such one way screw, in clockwise rotation—when viewed from the proximal end of the screw.

One advantage of the present invention is a manually operated screwdriver useful in operating screws of the "one-way" variety in either direction.

Another advantage of the present invention is an inexpensive screwdriver whose shape and size may be utilized to removel screws of various designs that are applicable to use in security devices such as locks and other similar apparatuses.

Still another advantage of the present invention is an inexpensively fabricated screwdriver which may be conveniently operated on screws of various sizes of the "one-way" variety.

Yet another advantage of the present invention is a screwdriver whose shaped and construction is readily identifiable with a "one-way" screw use, thereby facilitating convenient selection of the screwdriver above other screwdrivers which may be carried by the user from place to place.

A further advantage of the present invention is a one-way screwdriver that is simple to manufacture, inexpensive to fabricate, and useful in removing screws whose screw head surface is configured in a variety of shapes such that the shape presented to the screwdrive when operated in a clockwise direction is different from the shape presented to the screwdriver when operated in a counterclockwise direction.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. A bit for bi-directional driving one-way fasteners comprising a longitudinally extending shank terminating in a flat front face disposed in a plane substantially normal to the axis of said shank, two longitudinally extending and diametrically opposed flutes provided in said shank and extending forwardly into intersecting relation with said front face, each of said flutes including first and second surfaces, said first surfaces respectively forming at the intersection with said front face first shoulders, a pair of second shoulders, a pair of third surfaces, each of said pair of third surfaces extending angularly between said front face and each of said second shoulders, said front face having first and second axes of symmetry disposed at right angles to each other and intersecting each other at the longitudinal axis of said shank, one of said first shoulders lying along a line positioned on one side of said second axis and disposed above and substantially parallel to said first axis, the other of said first shoulders lying along a line positioned on the other of said second axis and disposed below and substantially parallel to said first axis, one of said second shoulders lying along a line substantially coincident with said second axis and disposed above said first axis, the other of said second shoulders lying along the line substantially coincident with said second axis and disposed below said first axis, whereby said front face includes two sector-shaped and diametrically opposed wings and a narrow connecting bridge, said pair of third surfaces being disposed in said opposed wings.

2. The apparatus as claimed in claim 1 wherein said each third surface forms angles with said front face in the angular range of fifteen degrees to sixty degrees.

3. The apparatus as claimed in claim 1 further comprising a rod, means to removably secure said bit to said rod.

4. The apparatus as claimed in claim 2 further comprising a handle, said handle being secured to said rod.

5. The apparatus as claimed in claim 4 wherein said handle comprises a plastic material.

6. The apparatus as claimed in claim 1 wherein said bit comprises steel.

* * * * *